(12) United States Patent
Yamamoto

(10) Patent No.: US 7,083,844 B2
(45) Date of Patent: Aug. 1, 2006

(54) ROCKER PANEL AND METHOD FOR MINIMIZING SAG LINES IN MOLDED PART

(75) Inventor: Hiroaki Yamamoto, Brookville, OH (US)

(73) Assignee: Green Tokai Co., Ltd., Brookville, OH (US)

( * ) Notice: Subject to any disclaimer, the term of this patent is extended or adjusted under 35 U.S.C. 154(b) by 0 days.

(21) Appl. No.: 10/818,407

(22) Filed: Apr. 5, 2004

(65) Prior Publication Data

US 2004/0185223 A1    Sep. 23, 2004

Related U.S. Application Data

(63) Continuation of application No. 10/068,438, filed on Feb. 6, 2002, now abandoned.

(51) Int. Cl.
*B29D 22/00* (2006.01)

(52) U.S. Cl. .................. 428/156; 428/157; 428/174; 428/177; 296/203.01; 296/209; 296/29; 296/146.9

(58) Field of Classification Search ................ 428/156, 428/157, 174, 177; 296/203.01, 209, 29, 296/146.9
See application file for complete search history.

(56) References Cited

U.S. PATENT DOCUMENTS

| | | |
|---|---|---|
| 4,363,839 A | 12/1982 | Watanabe et al. |
| 4,724,585 A | 2/1988 | Whitman |
| 4,850,638 A | 7/1989 | Vollrath et al. |
| 5,514,427 A | 5/1996 | Ellison et al. |
| 5,599,608 A | 2/1997 | Yamamoto et al. |
| 5,609,004 A | 3/1997 | Kreis |
| 5,639,522 A | 6/1997 | Maki et al. |
| 6,168,742 B1 | 1/2001 | Yamamoto |
| 6,171,543 B1 | 1/2001 | Hirose |
| 6,357,822 B1 | 3/2002 | Panoz et al. |

*Primary Examiner*—Alicia Chevalier
(74) *Attorney, Agent, or Firm*—Wegman, Hessler & Vanderburg

(57) ABSTRACT

An improved rocker panel on side sill construction includes a substantially planar horizontal top portion, a side portion with a substantially convex show surface and a substantially concave hidden surface opposite the show surface, and a clip house mounting structure disposed on the hidden surface. The improvement consists of joining the clip house to the rocker panel or side sill at the juncture formed between the top show surface and side show surface of the part. Preferably, this joint comprises at least one hollow channel surrounded by a reinforcing rib connecting to the hidden surface proximate the juncture of the top portion with the side portion and connecting the clip house mounting structure to this rib. The channel and reinforcing rib may run substantially longitudinally the length of the rocker panel. The channel and reinforcing rib inhibiting sagging in the top portion of the part between adjacent clip house mounting structures. The rocker panel or side sill may be made by gas-assisted injection molding wherein a mold including a mold cavity having the desired final shape, including one or more channel cavities, is provided. A predetermined amount of thermoplastic material is then injected into the mold cavity. Gas is injected into the one or more channel cavities at a predetermined pressure. The thermoplastic material is then allowed to set while the gas pressure is maintained.

5 Claims, 6 Drawing Sheets

ROCKER PANEL AND METHOD FOR MINIMIZING SAG LINES IN MOLDED PART

CROSS-REFERENCE TO RELATED APPLICATIONS

The present application is a continuation of application Ser. No. 10/068,438 filed Feb. 6, 2002 now abandoned. The disclosure of the above application is hereby incorporated by reference herein.

BACKGROUND OF THE INVENTION

The present invention pertains to molded plastic parts for attachment to a supporting member. More specifically, the present invention relates to clip house mounting structures which provide improved flexural characteristics and structural strength in the corresponding part.

Injection molded plastic parts are commonly used in the automotive industry for side panels, spoilers, dashboards, armrests, wheel covers, filler panels, trim pieces, bumpers, side-sill garnishes, rocker panels and the like. Typically these parts are provided with a painted, or other decorative surface such as by means of film lamination techniques. In such film lamination techniques, a paint film laminate is co-molded over an external show face surface of the plastic part. The film laminate is typically pre-formed, inserted into a mold cavity, and a thermoplastic resin is injected under pressure into the mold cavity against the backside of the laminate. The result is a plastic part having a film laminate co-molded over a plastic substrate. Laminated paint films are detailed in U.S. Pat. No. 5,514,427, the entire disclosure of which is incorporated by reference herein. Techniques for preforming paint film laminates and insert molding film-plastic parts are disclosed in U.S. Pat. No. 5,599,608, the disclosure of which is incorporated herein by reference.

These plastic parts are typically provided with a series of integrally molded attachment means for securing the part to the given support member. Structural strength of the attachment means is dependent upon the thickness of the plastic at the intersection of the attachment means with the remainder of the part to be supported. Thick plastic sections tend to impose shrink lines and sink marks in the show face surface when the plastic solidifies. U.S. Pat. No. 6,171,543, the disclosure of which is incorporated herein by reference, provides a reinforcing rib interposed between the connection of the clip house structure and the hidden side of the corresponding plastic part. The rib provides the required strength while limiting the thickness of plastic material proximate the show face surfaces of the part. Thereby, formation of shrink lines and sink marks in the show face surfaces, due to plastic shrinkage, are minimized.

In some elongated, injection molded automobile parts such as a rocker panels and side sill garnishes, excessive sagging has been noted along the top substantially planar horizontal portions of the part that are located between adjacent clip house mounting structures. Although applicant is not bound to any theory as to the reason for such sagging, it is thought that same occurs due to shrinkage of the plastic after the molding step. Accordingly, there is a need in the art to provide improved structure for attachment of the clip house to the part so as to inhibit sagging or plastic warpage between these clip house structures along the length of the part.

SUMMARY OF THE INVENTION

The rocker panel with clip house mounting structure includes a first joint connecting the part to the clip house. This joint may be in the form of a rib or the like and connects a support leg of the clip house to the juncture formed between the top show portion of the part and a depending side show portion of the part.

A second joint may be provided to connect the part and clip house. This may be positioned along the top of the part at a location that is transversely spaced from the first joint relative to a longitudinal axis extending along the elongated part.

The improved rocker panel construction may be made by a method comprising the steps of providing a mold having at least a female mold member and a male mold member wherein the female mold member is substantially concave and has a top show surface, a front show surface, and a bottom show surface. The male mold member is substantially convex and has a top hidden surface, a front hidden surface, a bottom hidden surface, and a sprue for injecting plastic. The female mold member and the male mold member cooperate to define a mold cavity with the female mold member and male mold member further cooperating to define a channel cavity running substantially along the longitudinal length of the mold cavity. A predetermined amount of thermoplastic resin is injected through the sprue into the mold cavity. Optionally, as is well known in the art, an inert gas is injected under pressure into the thermoplastic whereby channels are formed in the rib members. The thermoplastic resin is then allowed to cure or set.

As a preliminary step, a pre-formed film laminate may be inserted into the mold prior to the injection of the thermoplastic resin so that the thermoplastic resin flows onto the back of the laminate and presses a show face surface of the laminate against the show surfaces of the female mold member.

Other objects, benefits and advantages of the invention will be apparent from the following detailed description, the accompanying drawings and the appended claims.

Figure 5:
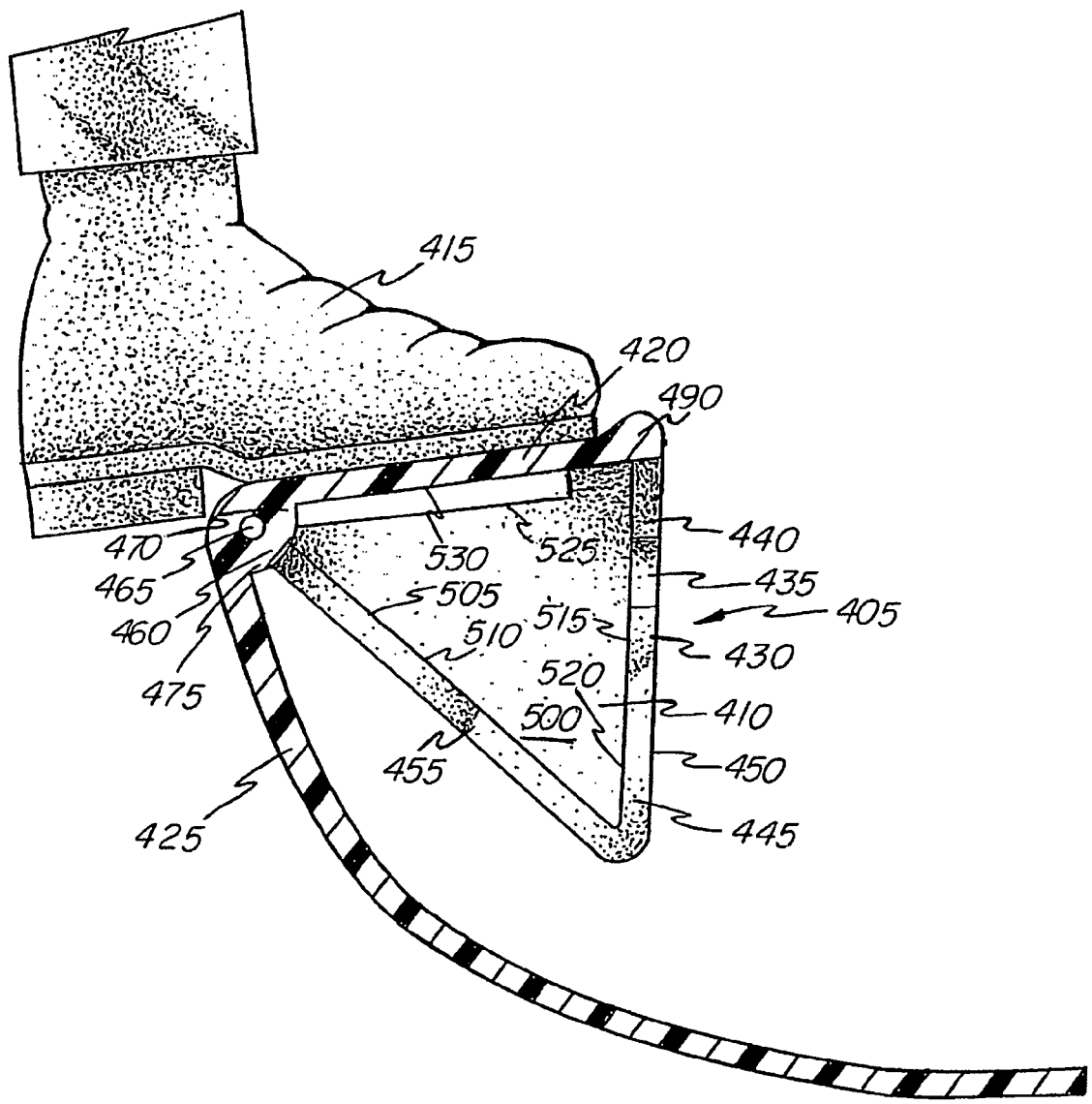
FIG. 5 is a transverse cross-sectional view of a second embodiment of a rocker panel made in accordance with the present invention.
Figure 7:
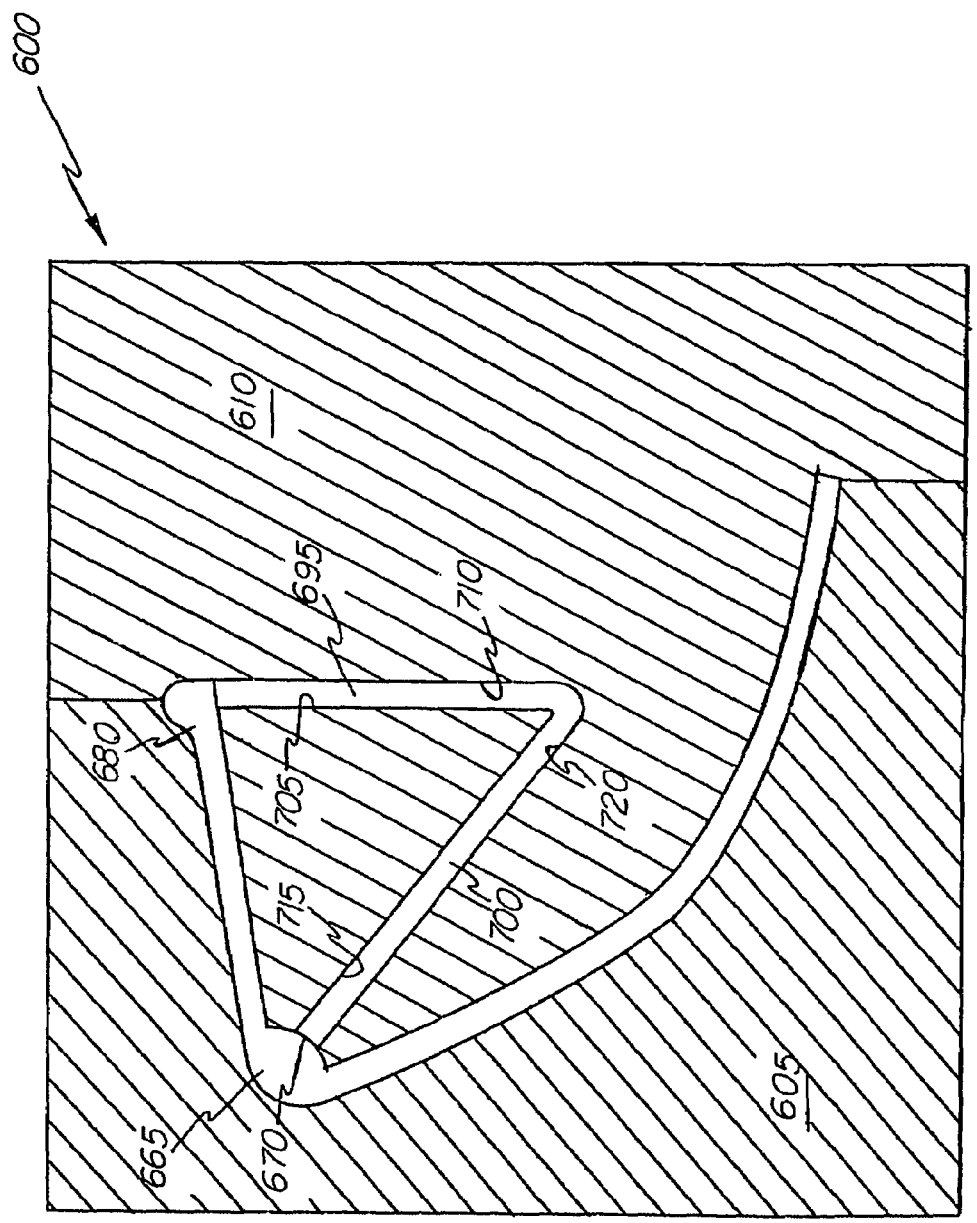

and, FIG. 7 is a transverse cross-sectional view of a mold used to injection mold the rocker panel of FIG. 5 shown at that portion of the mold corresponding to a line through the rocker panel taken through a clip house mounting structure.

The invention will be further described in the following detailed description.

DETAILED DESCRIPTION

Figure 1:
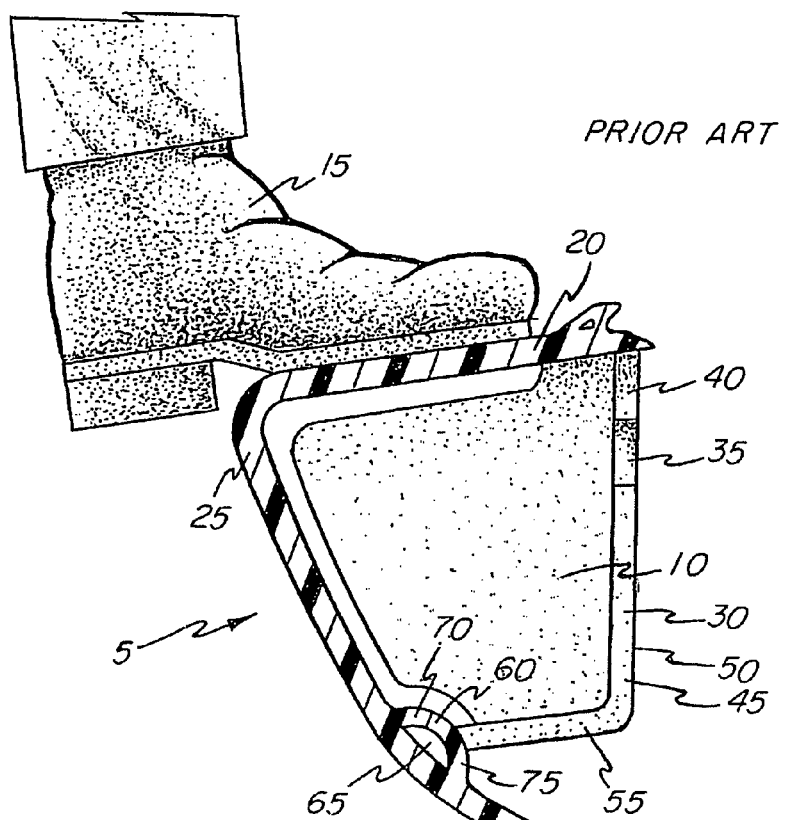
FIG. 1 is a transverse cross-sectional view of a rocker panel made in accordance with the prior art depicting the bottom leg of the clip house structure connected at the juncture of the side portion of the rocker panel and the bottom portion.
Figure 2:
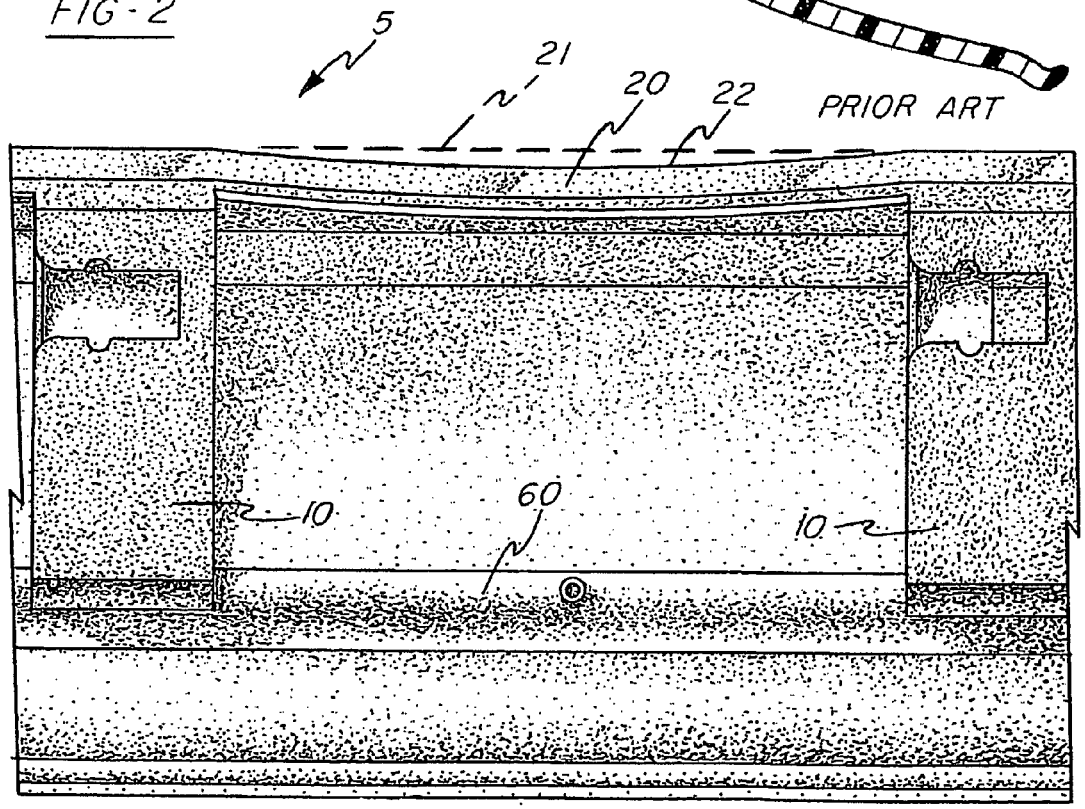
FIG. 2 is a rear elevation view of a longitudinal section of the rocker panel made in accordance with the prior art depicting the sag in the substantially planar horizontal top portion that may exist between adjacent clip house mounting structures of the part.

Referring initially to FIGS. 1 and 2 there is shown a rocker panel 5 in accordance with the prior art. The rocker panel 5 is shown with a clip house mounting structure 10 connected thereto. Additionally, the rocker panel 5 is shown with the foot 15 of a person positioned as anticipated on top of the top portion 20. With further reference to FIG. 2, the top portion 20 is shown to have a sag, reflected by line 22, from its desired profile as reflected by dashed line 21.

As can be seen from viewing FIG. 1, each clip house mounting structure 10 includes a clip mounting member 30 having a clip receiving means 35, an upper portion 40, and a lower portion 45 presenting a substantially planar clip mounting surface 50. The clip house mounting structure 10 further has a horizontal member 55 extending from the lower portion 45 of the clip mounting member 30 to a reinforcing rib 60. The reinforcing rib 60 is connected to a curved side panel 25 or skirt with foot portions 70, 75. The foot portions 70, 75 cooperate with a portion of the side panel to define a channel 65.

As can be seen in FIG. 2, the rocker panel 5 with clip house mounting structures 10 connected as shown in FIGS. 1 and 2 and as described above, is subject to sagging of the top portion 20 between adjacent clip house mounting structures 10. Sagging of the top portion 20 is thought to occur by reason of the difference in plastic shrinkage in the area around the clip house mounting structure 10 connections compared with the shrinkage of the unsupported portions of the top portion 20 between adjacent clip house mounting structures 10.

Figure 3:
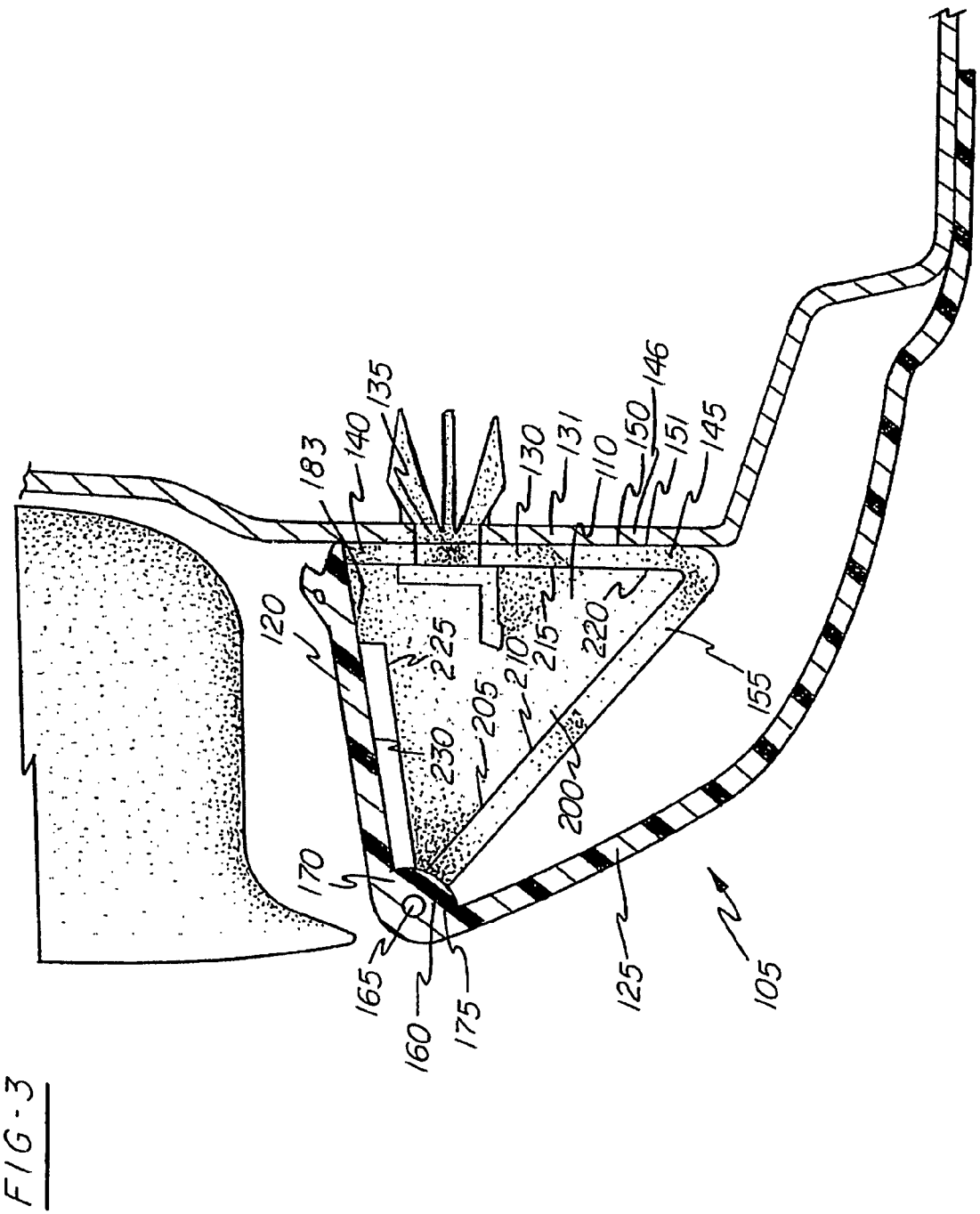
FIG. 3 is a transverse cross-sectional view of a rocker panel made in accordance with the instant invention depicting the clip house structure connection at the juncture of the top portion and the side portion of the rocker panel.

Turning now to FIG. 3 there is shown a rocker panel 105 with clip house mounting structure 110 in accordance with the present invention supporting a top portion 120 and a convex side show portion 125 or skirt of the rocker panel. The clip house mounting structure 110 has a clip mounting member 130 with a fastening means 135 located near the upper portion 140, a lower portion 145 and a mating surface 150. As depicted in FIG. 3, the rocker panel 105 is attached to a support member 131 of the auto or truck frame. The support member 131 has a lower portion 146 and a mating surface 151. Most preferably, the mating surfaces 150, 151 adjoin one another when the rocker panel 105 is fixed to the supporting member 131.

With further reference to FIG. 3, the clip house mounting structure 110 further includes a first structural support member 155 extending from the lower portion 145 of the clip mounting member 130 to the reinforcing rib 160 that is located at the juncture of the top surface with the side show surface. The reinforcing rib 160 has foot portions 170, 175 which cooperate with the juncture of the top portion 120 and the side portion 125 to define a channel 165. The reinforcing rib 160 and channel 165 extend longitudinally along substantially the entire length of the rocker panel 105 and provide increased flexibility of the part especially at those locations in which the rocker panel is connected to the clip house. The reinforcing rib 160 provides a strong connection for the structural support member 155 while facilitating minimal plastic thickness in any one area. The upper portion 140 of the clip mounting member is connected to the edge of the top portion 120 along surface 183.

In the preferred embodiment of rocker panel 105, the clip house mounting structure 110 includes a web 200 for additional structural strength. The web 200 is preferably connected along the edge 205 to an inner surface 210 of the structural support member 155 and along the edge 215 to an inner surface 220 of the clip mounting member 130. As shown, the web 200 may also be connected to the part along edge 225 to a top portion hidden surface 230 as shown at surface 183. The web 200 may be connected along a portion of its edges 205, 215, 225, as opposed to the entire edge.

As can be seen in FIG. 3, taken in contrast to FIG. 1, the junction or joint connecting the clip house to the show side surface or skirt of the rocker panel in accordance with the invention, is located at a portion wherein the top surface 120 of the rocker panel joins the side show surface 125 of the part. In contrast, the prior art device shown in FIG. 1 is such that the clip house is joined to the side show surface of the part at the approximate mid-length of the side show surface or skirt. The structure shown in FIG. 3 provides a fulcrum located between the top surface of the rocker panel and its side show surface to allow for bending action around this juncture. Preliminary test runs demonstrate that molded parts having a clip house structure such as that shown in FIG. 3 do not tend to exhibit the sagging type structure between adjacent clip houses as shown in FIG. 2.

Figure 4:
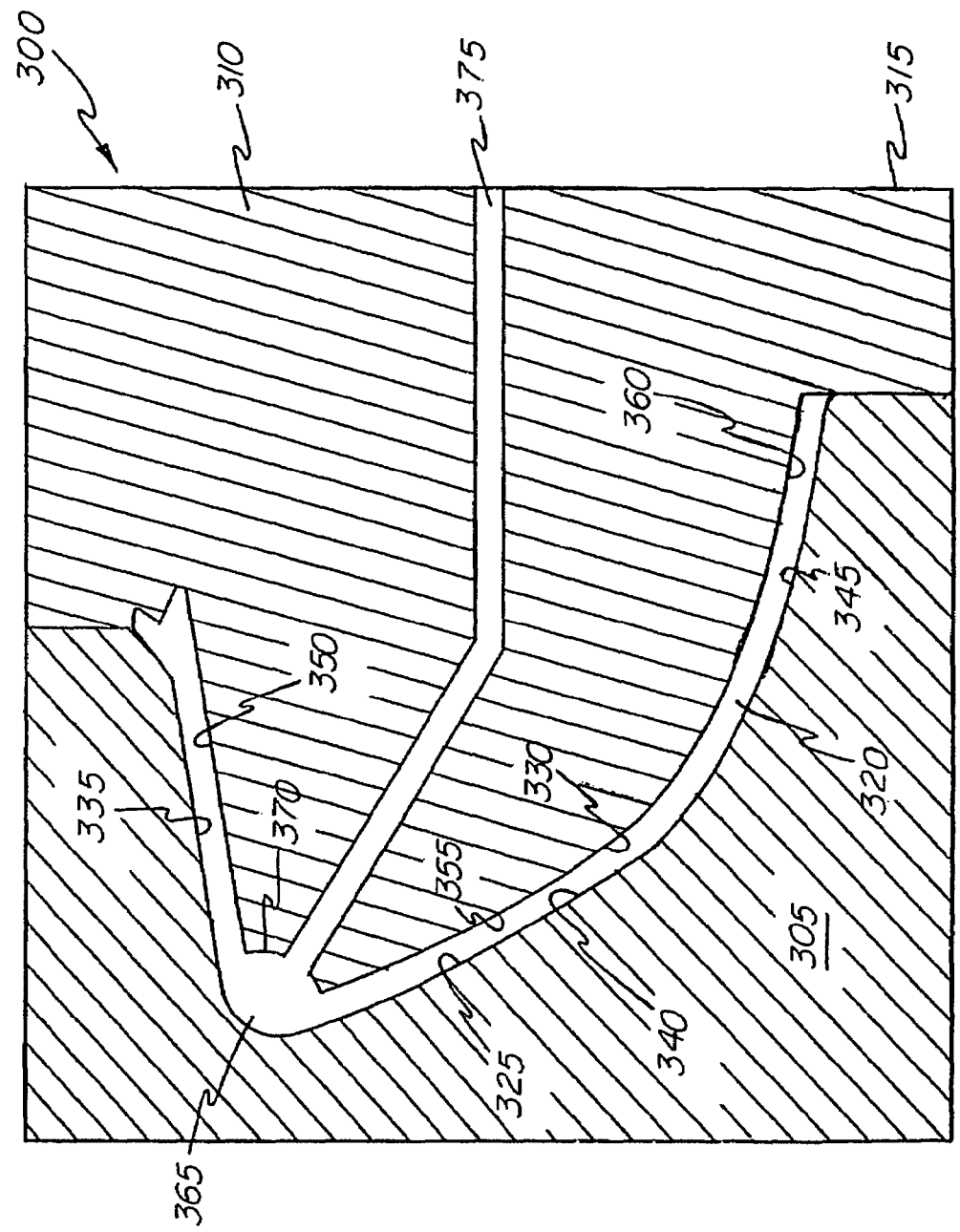
FIG. 4 is a transverse cross-sectional view of a mold used to injection mold the rocker panel of FIG. 3.

Turning now to FIG. 4, there is shown a sectional view of mold 300 for making the rocker panel 105 in accordance with the present invention. The mold 300 includes a female mold member 305, a male mold member 310 and a bottom mold member 315 defining a mold cavity 320. The precise number and arrangement of mold members will depend upon the desired shape of the rocker panel 105, or other part, the thermoplastic material used, and the type of injection molding process used. Although a three part mold is shown, the part could easily be made in a two part mold. The mold cavity 320 is further defined by a substantially convex show face surface 340, a substantially convex hidden surface 330, a top show face surface 335, a top hidden surface 350, a rib forming space 365 with corresponding elongated depression 370, and a sprue 375 in fluid communication with cavity 320 through space 365. The show face surface 340 includes a side portion 325 and a bottom portion 345. The hidden surface 330 includes a side portion 355 and a bottom portion.

A preferred method of making the rocker panel 105 of the present invention comprises providing the mold 300 of FIG. 4, including a show surface 340, a hidden surface 330, and a mold cavity 320 defined by the show surface 340 and the hidden surface 330, a channel-defining surface 370 contiguous with the hidden surface 330 defining a channel cavity 365, and a sprue 375 in fluid communication with the channel cavity 320, injecting a predetermined amount of thermoplastic resin under pressure through the sprue 375 into the mold cavity 320, stopping the flow of thermoplastic resin, injecting a predetermined amount of nonreactive gas under pressure through the sprue 375 into the channel cavity 320, allowing the thermoplastic resin to cure or set, and removing the cured thermoplastic resin from the mold.

To remove the rocker panel 105 from the mold 300, the bottom mold member 315 is first lowered from the completed rocker panel 105. The female mold member 305 is then separated from the male mold member 310 to reveal the rocker panel 105. Next, the portion of the male mold member 310 containing the sprue 375 may be separated from the rocker panel 105. If need be, the male mold member 310 may be withdrawn from the rocker panel 105 in sections to free the complex shape of the clip house mounting structure 110. If desired, the mold 300 may be provided with a cutting member (not shown) for separating the sprue material from the rocker panel 105 or venting the gas from the channel 165.

Viewing FIGS. 4 and 3, the method of the preferred embodiment produces the rocker panel 105 (see FIG. 3) having the channel 165 surrounded or defined substantially by the foot portions 170, 175 of the reinforcing rib 160. The channel 165 and the reinforcing rib 160 connect the lower portion 145 to the hidden surface 330 using the structural support member 155 such that the reinforcing rib 160 effectively branches or divides into two feet 170, 175 joined to the hidden surface 330.

The thickness of the reinforcing rib 160, the type and amount of thermoplastic material, and the gas pressure are chosen such that the thermoplastic material cures without producing sink marks in the show surface 340 opposite the feet 170, 175. Preferably, the channel 165 and reinforcing rib 160 run substantially along the entire length of the rocker panel 105, but may be limited to shorter runs, or even confined to an area immediately under the clip house mounting structures 110.

Suitable thermoplastic resins that may be used in the process of the instant invention include, without limitation, thermoplastic olefin and acrylonitrile butadiene-styrene. Additional suitable thermoplastic materials may include, for example, polyvinyl chloride, polycarbonate, polystyrene, polyethylene, polypropylene, polyethylene terephthalate-glycol, nylon, and RIM urethanes. Polyolefin homopolymers and copolymers are inexpensive thermoplastic resins which have excellent molding properties and may also be mentioned as being suitable for use.

In accordance with the invention, it is preferred to use gas-assisted injection molding techniques such as "full shot" injection molding. Alternatively, the improved rocker panel of the instant invention may be molded by means of a "short shot" method wherein a predetermined amount of thermoplastic material is first injected into the mold cavity, and then a predetermined amount of a gas is injected simultaneously with the remaining amount of thermoplastic material necessary to fill out the mold. While nitrogen is the preferred gas for use in gas-assisted injection molding, other inert or relatively nonreactive gases may be used as well.

In addition, as a preliminary step, a laminate such as, for example, a paint film laminate, may be preformed and inserted into the mold prior to the step of injecting the thermoplastic resin such that the thermoplastic resin is deposited against a rear surface of the laminate thereby pressing a show surface of the laminate against the show surface of the mold. The resulting plastic part has a show or decorative surface fused or bonded over a plastic substrate, and is substantially free of sink marks and other undesired depressions.

Referring now to FIG. 5, another rocker panel 405 is shown. Rocker panel 405 includes first reinforcing rib 460 and a second rib 490 extending longitudinally along opposing edges of the top portion 420. Rocker panel 405 includes clip house mounting structures 410 supporting a top portion 420 and a convex side portion 425. The clip house mounting structure 410 has a clip mounting member 430 with a fastening means 435 located near the upper portion 440, a lower portion 445 and a mating surface 450.

With further reference to FIG. 5, the clip house mounting structure 410 further includes a structural support member 455 extending from the lower portion 445 of the clip mounting member 430 to a first reinforcing rib 460. The first reinforcing rib 460 has foot portions 470, 475 which cooperate with the juncture of the top portion 420 and the side portion 425 to define a channel 465. The rib 460 and channel 465 extend longitudinally along substantially the entire length of the rocker panel 405 and impart rigidity and sag resistance to the top portion 420. The reinforcing rib 460 provides a strong connection for the structural support member 455 and provides a fulcrum for flexing of the surfaces 420 and 425 around the axis of the channel formed in the rib. The upper portion 440 of the clip mounting member is connected to a second reinforcing rib 490.

In the embodiment shown in FIG. 5, the clip house mounting structure 410 includes a web 500 for additional structural strength. The web 500 is preferably connected along the edge 505 to an inner surface 510 of the structural support member 455 and along the edge 515 to an inner surface 520 of the clip mounting member 430. The web 500 may also be connected along edge 525 to a top portion 120 hidden surface 530. The web 500 may be connected along a portion of its edges 505, 515, 525, as apposed to the entire edge.

Figure 6:
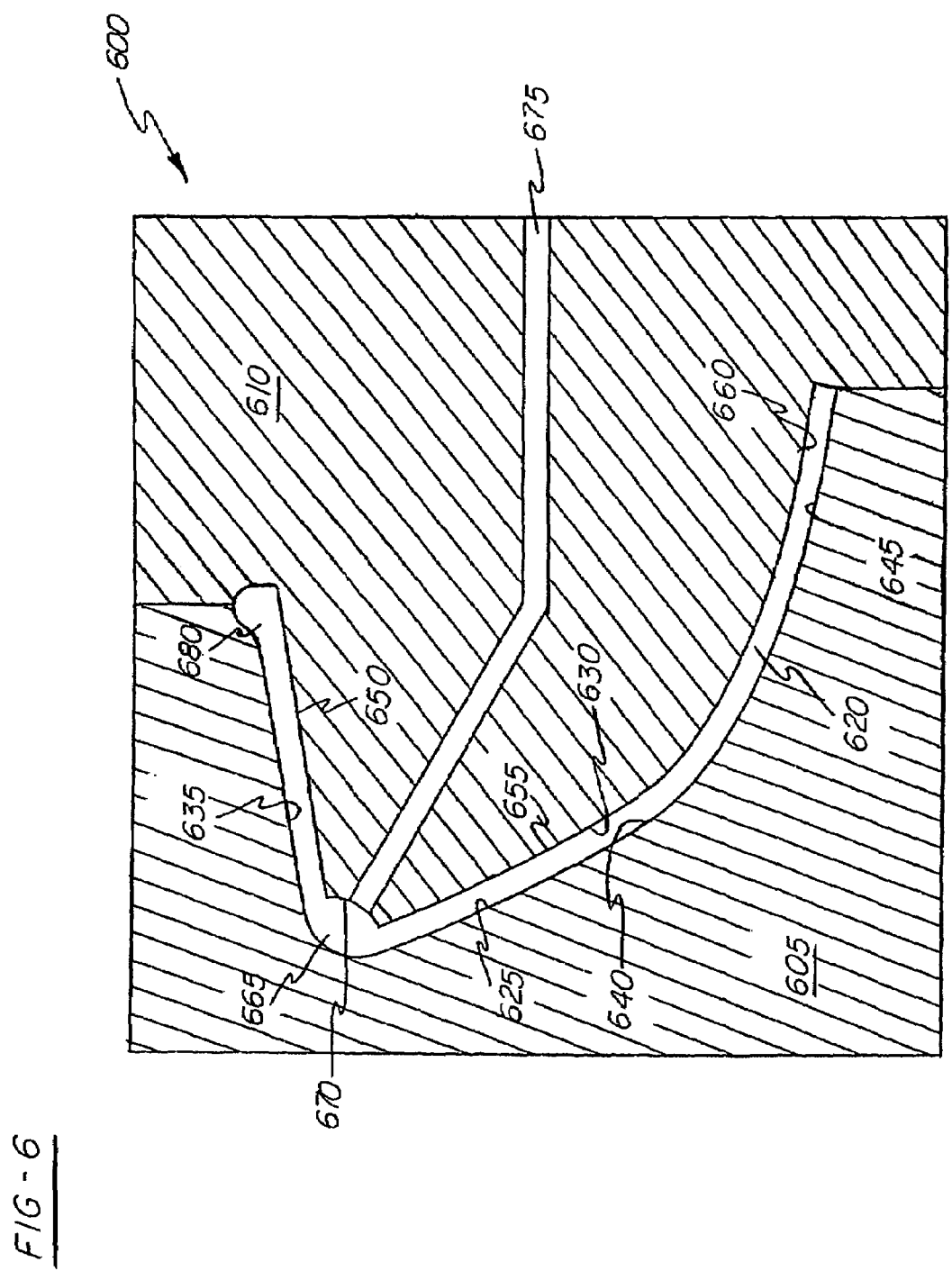
FIG. 6 is a transverse cross-sectional view of a mold used to injection mold the rocker panel of FIG. 5 shown at that portion of the mold corresponding to a plane through the rocker panel taken between adjacent clip house mounting structures.

Turning now to FIGS. 6 and 7, there is shown sectional views of mold 600 for making the rocker panel 405 in accordance with the present invention. FIG. 6 depicts a section taken through the mold 600 between clip house mounting structures. FIG. 7 depicts a section taken through the mold 600 at the location of a clip house mounting structure. The mold 600 includes a female mold member 605 and a male mold member 610 defining a mold cavity 620. The precise number and arrangement of mold members will depend upon the desired shape of the rocker panel 405, or other part, the thermoplastic material used, and the type of injection molding process used. Although a two-part mold is shown, the part could easily be made in a three-part mold. The mold cavity 620 is further defined by a substantially convex show face surface 640, a substantially convex hidden surface 630, a top show face surface 635, a top hidden surface 650, a first rib forming space 665 with corresponding first elongated depression 670 and a sprue 675 in fluid communication with cavity 620 including second rib forming space 680. The show face surface 640 includes a side portion 625 and a bottom portion 645. The hidden surface 630 includes a side portion 655 and a bottom portion 660. The mold cavity 620 is further defined by a clip mounting member cavity portion 695 (FIG. 7) and structural support member cavity portion 700. The cavity portion 695 is defined by mating surface 710 and inner surface 705. The cavity portion 700 is defined by outer surface 720 and inner surface 715.

The method of making the rocker panel 405 as illustrated in FIGS. 6 and 7 of the present invention comprises providing the mold 600 of FIGS. 6 and 7; injecting a predetermined amount of thermoplastic resin (not shown) under pressure through the sprue 675 (FIG. 6) into the mold cavity 620; stopping the flow of thermoplastic resin; injecting a predetermined amount of nonreactive gas (not shown) under pressure through the sprue 675 into the first and second rib-forming spaces 665, 680 to generate gas pressure in those spaces; solidifying the resin by allowing it to cure or set in the mold cavity 620 under controlled temperature conditions while maintaining the gas pressure in the first and second rib-forming spaces 665, 680; and removing the cured thermoplastic part 405 from the mold 600. A paint film laminate (not shown) may be positioned along the show surface 640 of the mold cavity 620 before the resin is injected into the mold cavity 620 to form a decorative surface on the finished rocker panel 405.

Thermoplastic resins suitable for use in making the rocker panel 105 (FIG. 3) are likewise suitable for making the rocker panel 405 (FIG. 5). The finished rocker panel 405 (FIG. 5) is removed from the mold 600 in a manner similar to that in which the rocker panel 105 (FIG. 3) is removed from the mold 300 (FIG. 4).

The addition of the second reinforcing rib 490 improves the attachment of the clip house mounting structure 610 to the top hidden surface 530 and further strengthens the rocker panel 405 against deflection when installed on an automobile (not shown) in a manner similar to the manner in which the rocker panel 105 is installed on an automobile, as shown in FIG. 3.

The preceding description and accompanying drawings are intended to be illustrative of the invention and not in any sense limiting. Various other modifications and applications will be apparent to those skilled in the art without departing from the true spirit and scope of the invention as defined literally by the claims and their equivalents.

What is claimed is:

1. Combination comprising a plastic automotive part and a clip house member connected to said part, said clip house being adapted to provide a mounting attachment to secure said automotive part to a corresponding mounting member of an automotive structural part and to support a load bearing force thereon;

A) said plastic automotive part comprising
      (i) a substantially planar load bearing top show surface spanning between a first end portion and a second end portion of said part, said first end portion adapted for positioning proximate said mounting member;
      (ii) a convex side show surface extending angularly away from said second end portion of said load bearing top show surface toward said mounting member;
      (iii) a ribbed juncture joining said second end of said planar load bearing top show surface and said convex side show surface at a location spaced from said mounting member and in underlying juxtaposition to said load bearing top show surface;
   B) said clip house comprising
      (i) a first support member connected to said ribbed junction and
      (ii) a second support member adjacent to and supportably underlying said first end portion of said substantially planar load bearing top show surface;
      (iii) whereby upon application of a load bearing force upon said substantially planar load bearing top show surface, said ribbed junction (A)(iii) provides a fulcrum for flexing of said top show surface (A)(i) and said convex side surface (A)(ii) around an axis extending along said ribbed juncture (A)(iii).

2. Combination as recited in claim 1 wherein said clip house further comprises a web connecting said first support member and said second support member.

3. Combination as recited in claim 1 wherein said clip house and said automotive part comprise a unitary molded structure.

4. Rocker panel comprising the combination of claim 1.

5. Combination as recited in claim 1 wherein said clip house comprises a substantially planar mating surface interconnecting said first support member B)(i) and said second support member B)(ii) and adapted to contiguously abut said mounting member.

* * * * *